(12) United States Patent
Tachikawa

(10) Patent No.: US 9,301,157 B2
(45) Date of Patent: Mar. 29, 2016

(54) RADIO COMMUNICATION SYSTEM, RADIO BASE STATION, AND RADIO TERMINAL

(75) Inventor: Hitoya Tachikawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 72 days.

(21) Appl. No.: 13/813,920

(22) PCT Filed: Aug. 4, 2011

(86) PCT No.: PCT/JP2011/067902
§ 371 (c)(1),
(2), (4) Date: Feb. 1, 2013

(87) PCT Pub. No.: WO2012/018096
PCT Pub. Date: Feb. 9, 2012

(65) Prior Publication Data
US 2013/0128766 A1    May 23, 2013

(30) Foreign Application Priority Data

Aug. 4, 2010   (JP) ................. 2010-175805

(51) Int. Cl.
| | | |
|---|---|---|
| H04W 24/00 | (2009.01) | |
| H04W 76/02 | (2009.01) | |
| H04W 24/06 | (2009.01) | |
| H04W 92/12 | (2009.01) | |
| H04L 12/26 | (2006.01) | |

(52) U.S. Cl.
CPC ........... *H04W 24/00* (2013.01); *H04L 43/0852* (2013.01); *H04W 76/022* (2013.01); *H04W 24/06* (2013.01); *H04W 92/12* (2013.01)

(58) Field of Classification Search
CPC ... H04W 76/022; H04W 24/00; H04W 92/12; H04W 24/06; H04W 28/065; H04W 84/047; H04W 40/36; H04W 92/20; H04W 92/04; H04L 43/0852; H04B 7/2606; H01L 2924/00013; H01L 2224/29099
See application file for complete search history.

(56) References Cited

U.S. PATENT DOCUMENTS

| | | | |
|---|---|---|---|
| 6,681,099 B1 * | 1/2004 | Keranen ................ | H04W 64/00 342/357.25 |
| 2002/0154600 A1 * | 10/2002 | Ido et al. ..................... | 370/216 |
| 2007/0127919 A1 * | 6/2007 | Kallstenius .................... | 398/25 |
| 2010/0074113 A1 * | 3/2010 | Muramoto .......... | H04L 43/0864 370/235 |
| 2010/0254277 A1 * | 10/2010 | Nylander et al. ............. | 370/252 |
| 2010/0260096 A1 * | 10/2010 | Ulupinar et al. .............. | 370/315 |

(Continued)

OTHER PUBLICATIONS

3GPP TS 36.300 V9.2.0 (Dec. 2009); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

(Continued)

*Primary Examiner* — Yee Lam
(74) *Attorney, Agent, or Firm* — Studebaker & Brackett PC

(57) ABSTRACT

The eNB 1 and the UE 2 establish the first bearer 11 between the eNB 1 and the UE 2 at the RRC layer, and the eNB 1 and the MME 3 establish the second bearer 12 between the eNB 1 and the MME 3 at the S1-AP layer. The OAM 4 measures the time length (TTL) of packet transfer between the eNB 1 and the UE 2, based on the transmission state of packets transmitted on the first bearer 11, and also measures the time length of packet transfer between the eNB 1 and the MME 3, based on the transmission state of packets transmitted on the second bearer 12.

7 Claims, 10 Drawing Sheets

(56) References Cited

U.S. PATENT DOCUMENTS

| | | | |
|---|---|---|---|
| 2010/0331012 A1* | 12/2010 | Zhang | 455/456.2 |
| 2011/0138033 A1* | 6/2011 | Yang et al. | 709/223 |
| 2011/0243024 A1* | 10/2011 | Osterling et al. | 370/252 |
| 2012/0178417 A1* | 7/2012 | Hapsari et al. | 455/411 |
| 2012/0269082 A1* | 10/2012 | Morper et al. | 370/252 |

OTHER PUBLICATIONS

3GPP TS 36.300 V9.4.0 (Jun. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

International Search Report; PCT/JP2011/067902; Nov. 1, 2011.

* cited by examiner

FIG. 4
(a) 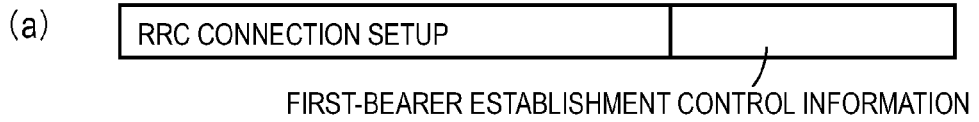
(b) 
FIG. 5
(a) 
(b) 
(c) 
FIG. 6
(a) 
(b) 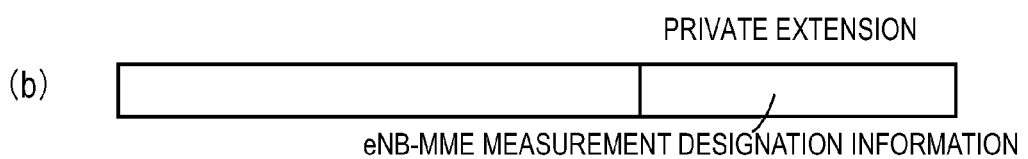

RADIO COMMUNICATION SYSTEM, RADIO BASE STATION, AND RADIO TERMINAL

TECHNICAL FIELD

The present invention relates to a radio communication system having a network-side apparatus, a radio base station controlled by the network-side apparatus, a radio terminal connected to the radio base station, and a monitor apparatus that monitors a network, and also relates to a radio base station and a radio terminal in the above radio communication system.

BACKGROUND ART

LTE (Long Term Evolution) of 3GPP (3rd Generation Partnership Project) is an intermediate technology of a currently-prevalent third-generation mobile phone (3G) communication scheme such as W-CDMA or CDMA2000 and a future fourth-generation mobile phone (4G) communication scheme, and is also referred to as a 3.9-generation mobile phone (3.9G) communication scheme. A radio communication system employing LTE has test specifications for testing the connection between nodes (see, for example, Non-patent Document 1).

PRIOR ART DOCUMENT

Non-Patent Document

Non-patent Document 1: 3GPP TS 36.300 V9.2.0, December, 2009

SUMMARY OF THE INVENTION

However, in measuring the time length of packet transfer between a radio base station (eNB) and a radio terminal (UE), if the UE knows the IP address of the eNB and sends the eNB an ICMP (Internet Control Message Protocol) packet, the ICMP packet is usually sent via not only a channel in a radio zone, but also a core network. For this reason, in a case of ICMP packet transfer, due to limitations in the specifications of the UE, the eNB, and an MME (Mobile Management Entity), the time length (TTL) of packet transfer directly between the eNB and the UE cannot be measured. Also, conventionally, the time length (TTL) of packet transfer between the UE and the MME cannot be measured, either.

In view of the above problems, an objective of the present invention is to provide a radio communication system, a radio base station, and a radio terminal, in which communication performance between nodes can be measured.

The present invention has the following features to solve the problems described above. A first feature of the present invention is summarized as follows. A radio communication system comprises: a network-side apparatus (a MME 3); a radio base station (an eNB 1) controlled by the network-side apparatus; and a radio terminal (an UE 2) connected to the radio base station, wherein the radio terminal and the radio base station establish a first logical communication channel (a first bearer) at a predetermined layer (a RRC layer) between the radio terminal and the radio base station, the first logical communication channel being for measurement of communication performance, the radio base station and the network-side apparatus establish a second logical communication channel (a second bearer) at the predetermined layer (a S1-AP layer) between the radio base station and the network-side apparatus, the second logical communication channel being for measurement of communication performance, the radio terminal measures the communication performance between the radio terminal and the radio base station based on a transmission state of a packet transmitted via the first logical transmission channel, and the radio terminal measures the communication performance between the radio base station and the network-side apparatus based on a transmission state of a packet transmitted via the second logical transmission channel.

In such a radio communication system, the first logical communication channel is established between the radio terminal and the radio base station, and the second logical communication channel is established between the radio base station and the network-side apparatus, the second logical communication channel being at a layer at the same level as the first logical communication channel. Further, through transmission of packets via the first logical communication channel and the second logical communication channel, the radio terminal can measure the communication performance between the radio terminal and the radio base station as well as the communication performance between the radio base station and the network-side apparatus, based on the transmission state of the packets.

A second feature of the present invention is summarized as follows. The radio terminal includes a first transmitter (a radio communication unit 206) that adds information for establishment of the first logical communication channel to a packet including a control plane (C-plane) control message, and sends the packet to the radio base station, and the radio base station includes a second transmitter (a radio communication unit 106) that adds the information for establishment of the first logical communication channel to a packet including a C-plane control message, and sends the packet to the radio terminal.

A third feature of the present invention is summarized as follows. The radio base station includes a third transmitter (a wire communication unit 104) that adds information for establishment of the second logical communication channel to a packet including a C-plane control message and sends the packet to the network-side apparatus, and the network-side apparatus includes a fourth transmitter (a wire communication unit 304) that adds the information for establishment of the second logical communication channel to a packet including a C-plane control message and sends the packet to the radio base station.

A forth feature of the present invention is summarized as follows. The radio terminal includes a fifth transmitter (the radio communication unit 206) that sends a first packet to the radio base station via the first logical communication channel, the first packet being accompanied by information indicating that the first packet is for measurement of the communication performance between the radio terminal and the radio base station, and a sixth transmitter (the radio communication unit 206) that sends a monitor apparatus that monitors a network a transmission time of the first packet, the radio base station includes a first receiver (the radio communication unit 106) that receives the first packet from the radio terminal via the first logical communication channel, and a seventh transmitter (the radio communication unit 106) that sends the first packet to the radio terminal via the first logical communication channel, and the radio terminal includes a second receiver (the radio communication unit 206) that receives the first packet from the radio base station via the first logical communication channel, and an eighth transmitter (the radio communication unit 206) that sends the monitor apparatus a receipt time of the first packet.

A fifth feature of the present invention is summarized as follows. The radio terminal includes a ninth transmitter (the radio communication unit 206) that sends a second packet to the radio base station via the first logical communication channel, the second packet being accompanied by information indicating that the second packet is for measurement of the communication performance between the radio base station and the network-side apparatus, and a tenth transmitter (the radio communication unit 206) that sends the monitor apparatus a transmission time of the second packet, the radio base station includes a third receiver (the radio communication unit 106) that receives the second packet from the radio terminal via the first logical communication channel, and an eleventh transmitter (the wire communication unit 104) that sends the second packet to the network-side apparatus via the second logical communication channel, the network-side apparatus includes a fourth receiver (the wire communication unit 304) that receives the second packet from the radio base station via the second logical communication channel, and a twelfth transmitter (the wire communication unit 304) that sends the second packet to the radio base station via the second logical communication channel, the radio base station includes a fifth receiver (the wire communication unit 104) that receives the second packet from the network-side apparatus via the second logical communication channel, and a thirteenth transmitter (the radio communication unit 106) that sends the second packet to the radio terminal via the first logical communication channel, and the radio terminal includes a sixth receiver (the radio communication unit 206) that receives the second packet from the radio base station via the first logical communication channel, and a fourteenth transmitter (the radio communication unit 206) that sends the monitor apparatus a receipt time of the second packet.

A sixth feature of the present invention is summarized as follows. The radio terminal includes a fifteenth transmitter (the radio communication unit 206) that sends a third packet to the radio base station via the first logical communication channel, the third packet being accompanied by information indicating that the third packet is for measurement of the communication performance between the radio base station and the network-side apparatus, the radio base station includes a seventh receiver (the radio communication unit 106) that receives the third packet from the radio terminal via the first logical communication channel, and a sixteenth transmitter (the wire communication unit 104) that sends the third packet to the network-side apparatus via the second logical communication channel, and the network-side apparatus includes an eighth receiver (the wire communication unit 304) that receives the third packet from the radio base station via the second logical communication channel, and a seventeenth transmitter (the wire communication unit 304) that sends a monitor apparatus that monitors a network a receipt time of the third packet.

A seventh feature of the present invention is summarized as follows. The predetermined layer is an RRC (Radio Resource Control) layer between the radio terminal and the radio base station and is an S1-AP layer between the radio base station and the network-side apparatus.

An eighth feature of the present invention is summarized as follows. A radio communication system comprises: a network-side apparatus (the MME 3); a radio base station (the eNB 1) controlled by the network-side apparatus; and a radio terminal (the UE 2) connected to the radio base station, wherein the radio terminal and the radio base station establish a first logical communication channel (the first bearer) at a predetermined layer (the RRC layer) between the radio terminal and the radio base station, the logical communication channel being for measurement of communication performance, and the radio terminal measures the communication performance of the logical communication channel based on a transmission state of a packet transmitted via the logical communication channel.

A ninth feature of the present invention is summarized as follows. A radio base station which is controlled by a network-side apparatus and to which a radio terminal is connected, in a radio communication system including a monitor apparatus that monitors a network, comprises: a logical-communication-channel establishment unit (a logical-communication-channel establishment unit 151) that establishes a first logical communication channel at a predetermined layer between the radio terminal and the radio base station, and establishes a second logical communication channel at the predetermined layer between the radio base station and the network-side apparatus, the first and second logical communication channels being for measurement of communication performance; a first receiver (the radio communication unit 106) that receives any one of a first packet, a second packet, and a third packet via the first logical communication channel, the first packet being accompanied by information indicating that the first packet is for measurement of the communication performance between the radio terminal and the radio base station, the second packet being accompanied by information indicating that the second packet is for measurement of the communication performance between the radio base station and the network-side apparatus, the third packet being accompanied by information indicating that the third packet is for measurement of the communication performance between the radio base station and the network-side apparatus; a first transmitter (the radio communication unit 106) that sends the first packet to the radio terminal via the first logical communication channel when the first receiver receives the first packet; a second transmitter (the wire communication unit 104) that sends the second packet to the network-side apparatus via the second logical communication channel when the first receiver receives the second packet, and sends the third packet to the network-side apparatus via the second logical communication channel when the first receiver receives the third packet; a third transmitter (the wire communication unit 104) that sends the monitor apparatus a receipt time of the third packet when the first receiver receives the third receipt packet; a second receiver (the wire communication unit 104) that receives the second packet from the network-side apparatus via the second logical communication channel after the second transmitter sends the second packet; and a fourth transmitter (the radio communication unit 106) that sends the third packet to the radio terminal via the first logical communication channel when the second receiver receives the second packet.

A tenth feature of the present invention is summarized as follows. A radio terminal connected to a radio base station controlled by a network-side apparatus in a radio communication system including a monitor apparatus that monitors a network, comprises: a logical-communication-channel establishment unit (a logical-communication-channel establishment unit 251) that establishes a first logical communication channel at a predetermined layer between the radio terminal and the radio base station, and establishes a second logical communication channel at the predetermined layer between the radio base station and the network-side apparatus, the first and second logical communication channels being for measurement of communication performance; a first transmitter (the radio communication unit 206) that sends any one of a first packet, a second packet, and a third packet to the radio base station via the first logical communication channel, the first packet being accompanied by information indicating that the first packet is for measurement of the communication performance between the radio terminal and the radio base station, the second packet being accompanied by information indicating that the second packet is for measurement of the communication performance between the radio base station and the network-side apparatus, the third packet being accompanied by information indicating that the third packet is for measurement of the communication performance between the radio base station and the network-side apparatus; a second transmitter (the radio communication unit 206) that sends the monitor apparatus a transmission time of the first packet when the first transmitter sends the first packet and that sends the monitor apparatus a transmission time of the second packet when the first transmitter sends the second packet; a receiver (the radio communication unit 206) that receives the first packet from the radio base station via the first logical communication channel after the first transmitter sends the first packet, and that receives the second packet from the radio base station via the first logical communication channel after the first transmitter sends the second packet; and a third transmitter (the radio communication unit 206) that sends the monitor apparatus a receipt time of the first packet when the receiver receives the first packet, and that sends the monitor apparatus a receipt time of the second packet when the receiver receives the second packet.

BRIEF DESCRIPTION OF THE DRAWINGS

FIG. 4 is a diagram showing information for establishment of a first bearer according to the embodiment of the present invention.

FIG. 5 is a diagram showing information for establishment of a second bearer according to the embodiment of the present invention.

FIG. 6 is a diagram showing information for measurement of the time length of transfer according to the embodiment of the present invention.

DESCRIPTION OF THE EMBODIMENT

Next, an embodiment of the present invention is described with reference to the drawings. Specifically, descriptions are given of: (1) Configuration of the Radio Communication System, (2) Operation of the Radio Communication System, (3) Advantageous Effects, and (4) Other Embodiments. In the following description of the drawings, same or similar reference signs denote same or similar elements and portions.

(1) Configuration of the Radio Communication System

First, the configuration of a radio communication system according to the embodiment of the present invention is described, as to (1.1) Overall Schematic Configuration of the Radio Communication System, (1.2) Configuration of the Radio Base Station (eNB), (1.3) Configuration of the Radio Terminal (UE), (1.4) Configuration of the MME, and (1.5) Configuration of the OAM, in this order.

(1.1) Overall Schematic Configuration of the Radio Communication System

Figure 1:
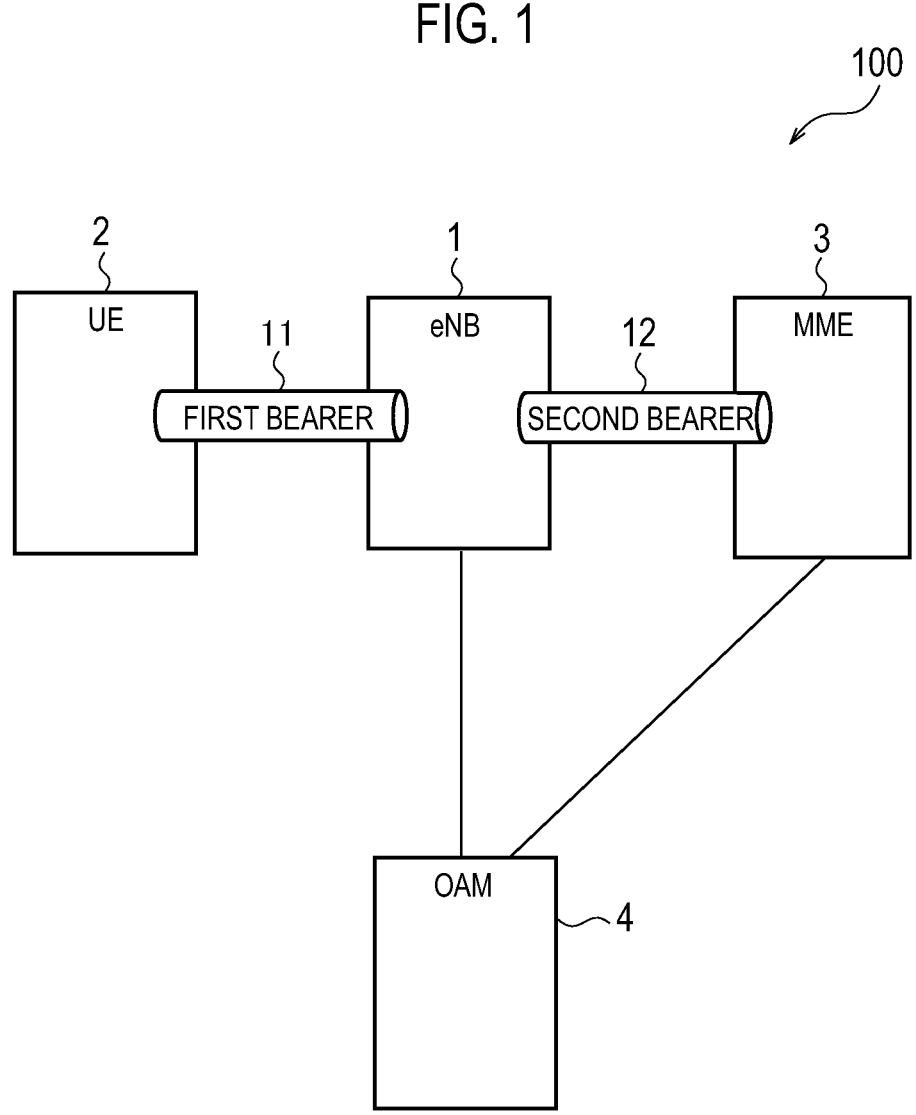
FIG. 1 is a diagram showing the overall schematic configuration of a radio communication system according to an embodiment of the present invention.

FIG. 1 is a diagram showing the overall schematic configuration of a radiocommunication system 100 according to the embodiment of the present invention.

The radio communication system 100 shown in FIG. 1 is a radio communication system employing LTE. The radio communication system 100 includes an LTE base station (eNB) 1 as a radio base station, a radio terminal (UE) 2, an MME 3 as a network-side apparatus, and an OAM (Operation Administration and Maintenance) as a monitor apparatus.

In FIG. 1, a first bearer 11 is established between the eNB 1 and the UE 2, the first bearer 11 being a logical communication channel for measuring the time length of packet transfer between the eNB 1 and the UE 2. A second bearer 12 is established between the eNB 1 and the MME 3, the second bearer 12 being a logical communication channel for measuring the time length of packet transfer between the eNB 1 and the MME 3.

Figure 2:
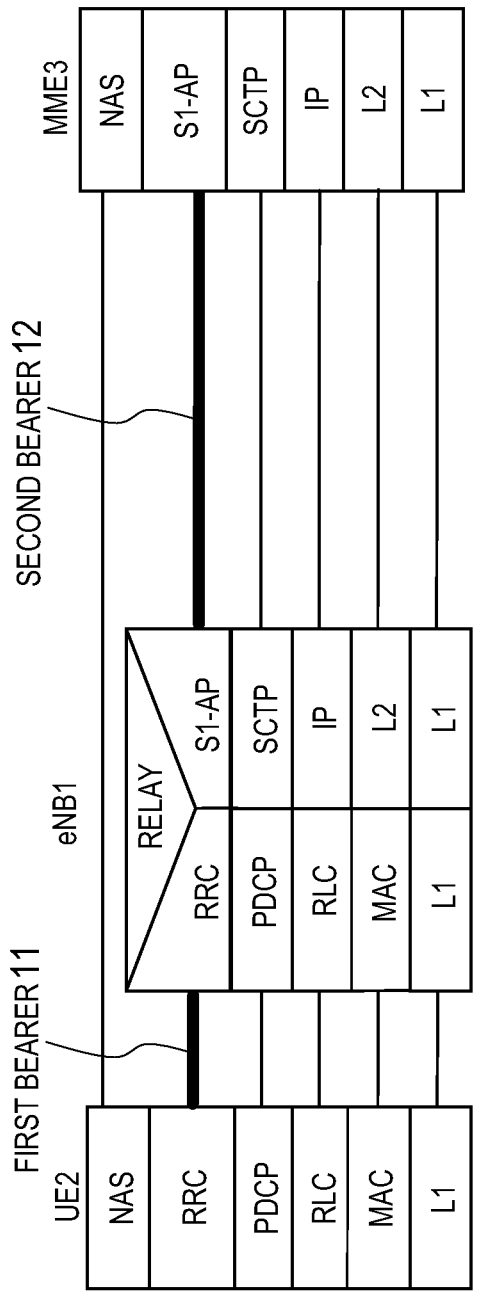
FIG. 2 is a diagram showing a protocol stack of the radio communication system according to the embodiment of the present invention.

FIG. 2 is a diagram showing a protocol stack of the radio communication system 100. As shown in FIG. 2, the first bearer 11 is a logical communication channel between the eNB 1 and the UE 2, at the RRC (Radio Resource Control) layer. The second bearer 12 is a logical communication channel between the eNB 1 and the MME 3, at the S1-AP layer. The RRC layer and the S1-AP layer are at the same level. Accordingly, the first bearer 11 and the second bearer 12 are established at the layers of the same level.

Further, the RRC layer and the S1-AP layer are at a level lower than the NAS (Non Access Stratum) layer and higher than the Layer 3 which is a network layer. The eNB 1 in the middle cannot be involved in the NAS layer because the NAS layer is for tunneling.

(1.2) Configuration of the eNB 1

Figure 3:
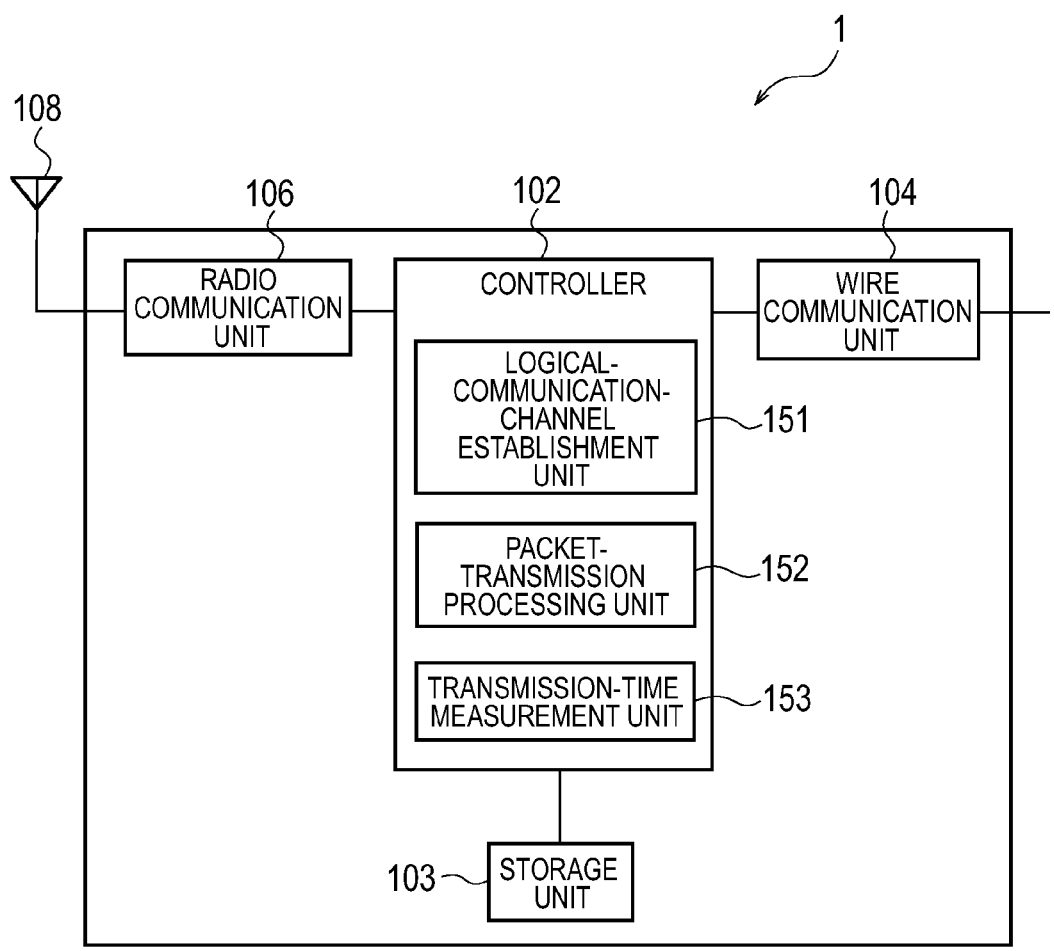
FIG. 3 is a diagram showing the configuration of an eNB according to the embodiment of the present invention.

FIG. 3 is a diagram showing the configuration of the eNB 1. The eNB 1 shown in FIG. 3 includes a controller 102, a storage unit 103, a wire communication unit 104, a radio communication unit 106, and an antenna 108.

The controller 102 is configured by, for example, a CPU (Central Processing Unit) or a DSP (Digital Signal Processor), and controls various functions of the eNB 1. The storage unit 103 is configured by, for example, a memory, and stores various pieces of information used for control and the like in the eNB 1.

The wire communication unit 104 performs data transmission and reception between the MME 3 and the OAM 4. The radio communication unit 106 includes an RF circuit, a baseband circuit, and the like to perform modulation and demodulation, coding and decoding, and the like, and performs transmission and reception of radio signals between the eNB 1 and the UE 2 via the antenna 108.

The controller 102 includes a logical-communication-channel establishment unit 151, a packet-transmission processing unit 152, and a transmission-time measurement unit 153.

The logical-communication-channel establishment unit 151 performs processing for establishment of the first bearer 11 between the eNB 1 and the UE 2, as well as processing for establishment of the second bearer 12 between the eNB 1 and the MME 3.

Figure 10:
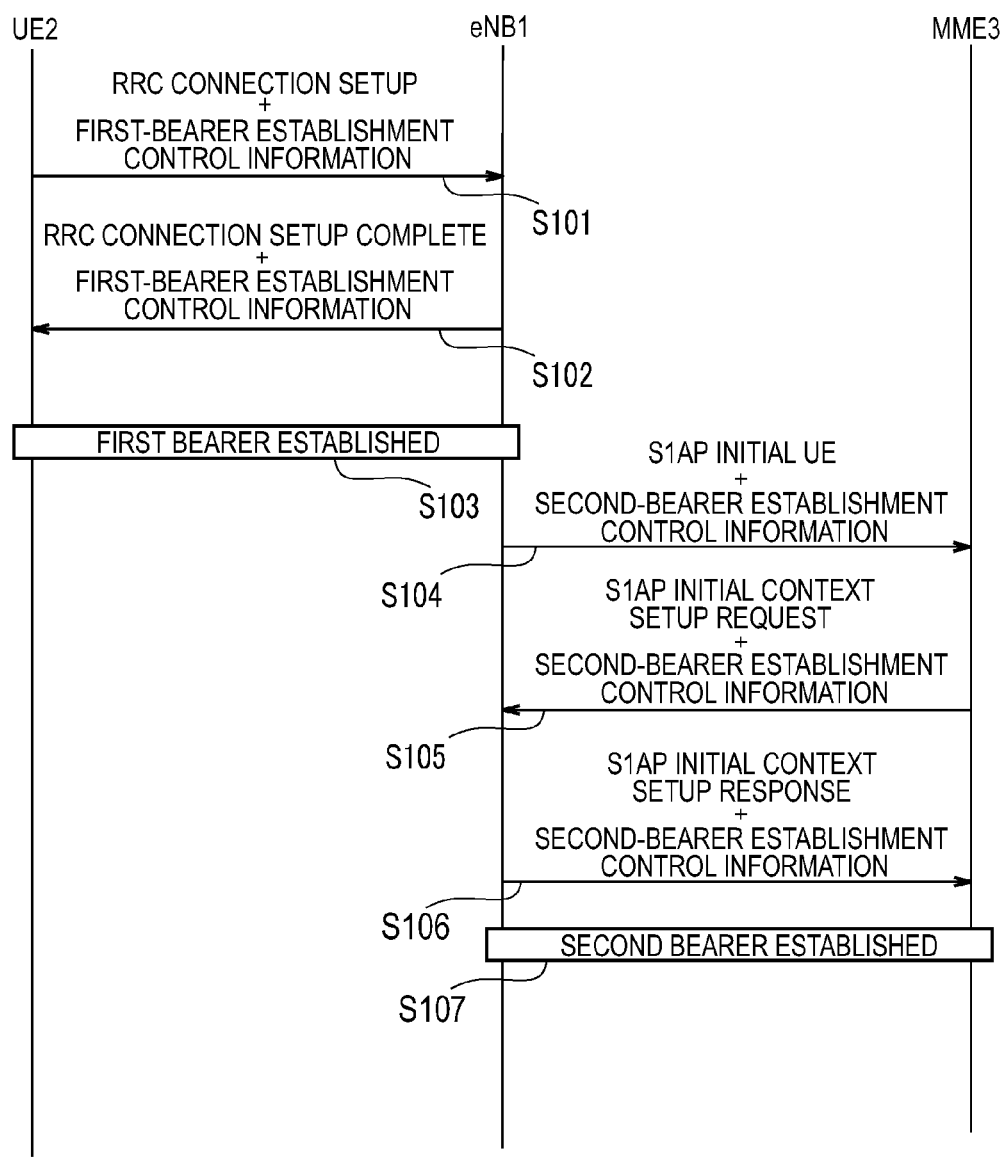
FIG. 10 is a sequence diagram showing an operation of the radio communication system establishing the bearers, according to the embodiment of the present invention.

Specifically, the first bearer 11 is established as follows (which corresponds to Steps S101 to S103 in FIG. 10). First, the radio communication unit 106 receives a packet from the UE 2 via the antenna 108, the packet including an RRC Connection Setup message and accompanied by first-bearer establishment control information. The RRC Connection Setup message is a C-plane control message with which the UE 2 requests the eNB 1 to establish RRC connection between the eNB 1 and the UE 2.

As shown in FIG. 4(a), the packet including the RRC Connection Setup message is accompanied by, at the end of the packet, the first-bearer establishment control information which is information for establishment of the first bearer 11. The first-bearer establishment control information is not particularly limited as long as the recipient can be informed by that information that the first bearer 11 needs to be established.

The radio communication unit 106 outputs the packet to the controller 102, the packet including the RRC Connection Setup message and accompanied by the first-bearer establishment control information.

When the packet including the RRC Connection Setup message and accompanied by the first-bearer establishment control information is inputted, the logical-communication-channel establishment unit 151 learns that the packet is accompanied by the first-bearer establishment control information. Then, after the controller 102 establishes RRC connection, the logical-communication-channel establishment unit 151 generates a packet including an RRC Connection Setup Complete message and accompanied by the first-bearer establishment control information. The RRC Connection Setup Complete message is a C-plane control message indicating that the establishment of the RRC connection between the eNB1 and the UE 2 is completed.

As shown in FIG. 4(b), the packet including the RRC Connection Setup Complete message is accompanied by, at the end of the packet, the first-bearer establishment control information which is information for establishment of the first bearer 11.

The logical-communication-channel establishment unit 151 generates the packet which is given the first-bearer establishment control information and includes the RRC Connection Setup Complete message, and outputs the packet to the radio communication unit 106. Via the antenna 108, the radio communication unit 106 sends the UE 2 the packet including the RRC Connection Setup Complete message and accompanied by the first-bearer establishment control information.

As described above, the first bearer 11 is established through transmission and reception of the packet including the RRC Connection Setup message and accompanied by the first-bearer establishment control information and the packet including the RRC Connection Setup Complete message and accompanied by the first-bearer establishment control information, between the eNB1 and the UE 2.

In addition, specifically, the second bearer 12 is established as follows (which corresponds to Steps S104 to S107 in FIG. 10). The logical-communication-channel establishment unit 151 generates a packet including an S1-AP Initial UE message and accompanied by second-bearer establishment control information, and outputs the packet to the wire communication unit 104. The S1-AP Initial UE message is a C-plane control message.

As shown in FIG. 5(a), the packet including the S1-AP Initial UE message is accompanied by, at the end of the packet, the second-bearer establishment control information which is information for establishment of the second bearer 12. The second-bearer establishment control information is not particularly limited as long as the recipient can be informed by that information that the second bearer 12 needs to be established.

The wire communication unit 104 sends the MNE 3 the packet including the S1-AP Initial UE message and accompanied by the second-bearer establishment control information.

Upon receipt of the packet including the S1-AP Initial UE message and accompanied by the second-bearer establishment control information, the MME 3 sends a packet including an S1-AP Initial Context Setup Request message and accompanied by the second-bearer establishment control information. The S1-AP Initial Context Setup Request message is a C-plane control message.

As shown in FIG. 5(b), the packet including the S1-AP Initial Context Setup Request message is accompanied by, at the end of the packet, the second-bearer establishment control information which is information for establishment of the second bearer 12.

The wire communication unit 104 receives the packet including the S1-AP Initial Context Setup Request message and accompanied by the second-bearer establishment control information, and outputs the packet to the controller 102.

When the packet including the S1-AP Initial Context Setup Request message and accompanied by the second-bearer establishment control information is inputted, the logical-communication-channel establishment unit 151 generates a packet including an S1-AP Initial Context Setup Response message and accompanied by the second-bearer establishment control information. The S1-AP Initial Context Setup Response message is a C-plane control message.

As shown in FIG. 5(c), the packet including the S1-AP Initial Context Setup Response message is accompanied by, at the end of the packet, the second-bearer establishment control information which is information for establishment of the second bearer 12. The logical-communication-channel establishment unit 151 outputs the packet to the wire communication unit 104, the packet including the S1-AP Initial Context Setup Response message and accompanied by the second-bearer establishment control information. The wire communication unit 104 sends the MME 3 the packet including the S1-AP Initial Context Setup Response message and accompanied by the second-bearer establishment control information.

As described above, the second bearer 12 is established through transmission and reception of the packet including the S1-AP Initial UE message and accompanied by the second-bearer establishment control information, the packet including the S1-AP Initial Context Setup Request message and accompanied by the second-bearer establishment control information, and the packet including the S1-AP Initial Context Setup Response message and accompanied by the second-bearer establishment control information, between the eNB1 and the MME 3.

After the establishment of the first bearer 11 and the second bearer 12, any of the following first processing and second processing related to measurement of the time length of packet transfer is performed.

(First Processing)

Figure 11:
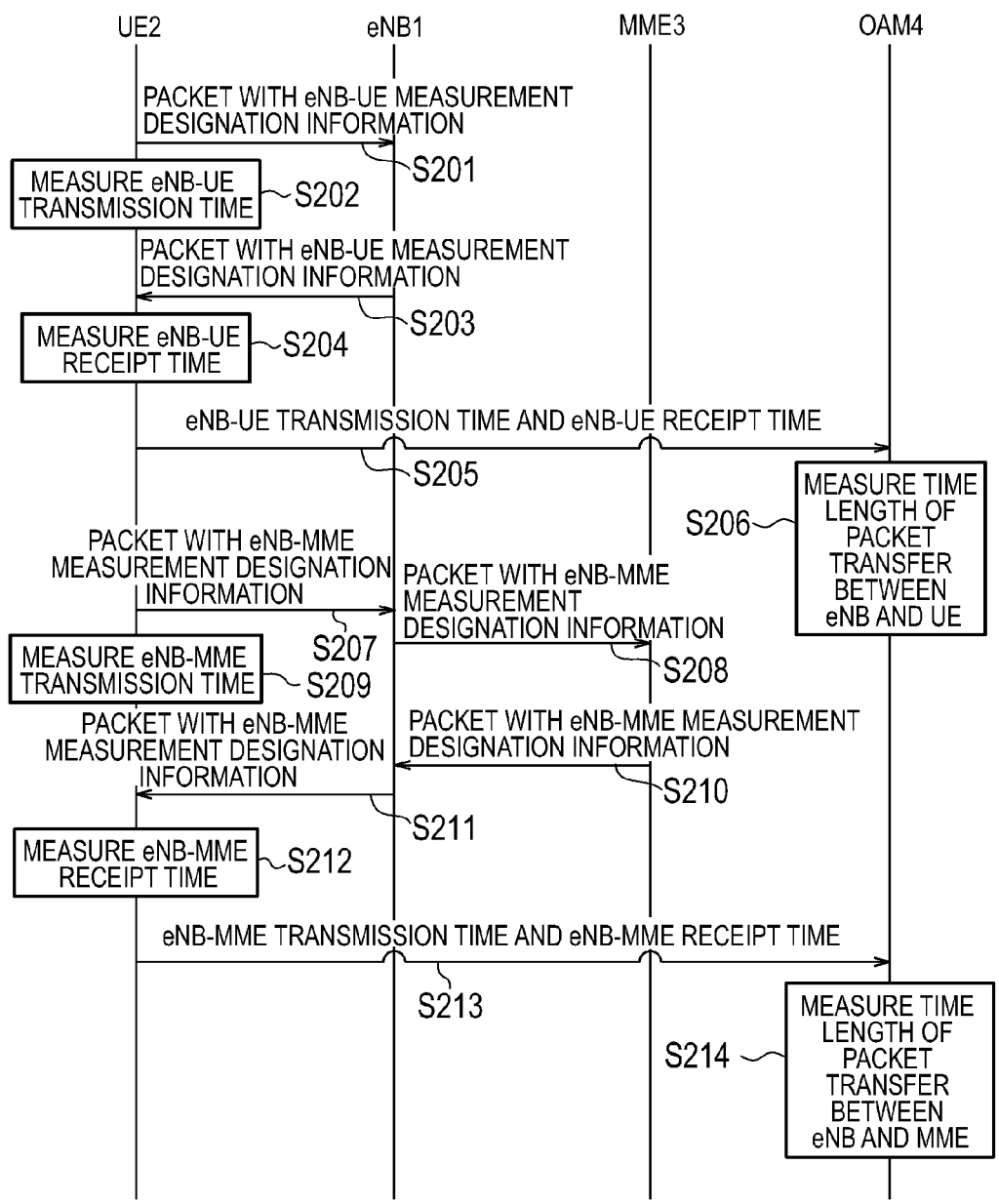
FIG. 11 is a sequence diagram showing a first operation of the radio communication system measuring the time length of packet transfer, according to the embodiment of the present invention.

(The Following Processes Correspond to Steps S201 and S203 in FIG. 11.)

Via the first bearer 11, the UE 2 sends a packet accompanied by eNB-UE measurement designation information (a packet with eNB-UE measurement designation information), which is a packet for measurement of the length of transfer time. As shown in FIG. 6(a), the packet with eNB-UE measurement designation information is accompanied by a field called Private Extension at the end of the packet, and the eNB-UE measurement designation information (e.g., a one-bit-long flag) indicating that the packet is for measurement of the time length of packet transfer between the eNB 1 and the UE 2 is added to this field called Private Extension.

The radio communication unit 106 receives the packet with eNB-UE measurement designation information via the first bearer 11 and the antenna 108. Moreover, the radio communication unit 106 outputs the packet with eNB-UE measurement designation information to the controller 102.

When the packet with eNB-UE measurement designation information is inputted, the packet-transmission processing unit 152 learns from the eNB-UE measurement designation information that the time length of packet transfer between the eNB 1 and the UE 2 needs to be measured. Further, the packet-transmission processing unit 152 outputs the packet with eNB-UE measurement designation information to the radio communication unit 106. The radio communication unit 106 sends the UE 2 the packet with eNB-UE measurement designation information via the antenna 108 and the first bearer 11.

(The Following Processes Correspond to Steps S207, S208, S210, and S211 in FIG. 11.)

Via the first bearer 11, the UE 2 sends a packet accompanied by eNB-MME measurement designation information (a packet with eNB-MME measurement designation information), which is a packet for measurement of the length of transfer time. As shown in FIG. 6(b), the packet with eNB-MME measurement designation information is accompanied by a field called Private Extension at the end of the packet, and the eNB-MME measurement designation information (e.g., a one-bit-long flag) indicating that the packet is for measurement of the time length of packet transfer between the eNB 1 and the MME 3 is added to this field called Private Extension.

The radio communication unit 106 receives the packet with eNB-MME measurement designation information via the first bearer 11 and the antenna 108. Moreover, the radio communication unit 106 outputs the packet with eNB-MME measurement designation information to the controller 102.

When the packet with eNB-MME measurement designation information is inputted, the packet-transmission processing unit 152 learns from the eNB-MME measurement designation information that the time length of packet transfer between the eNB 1 and the MME 3 needs to be measured. Further, the packet-transmission processing unit 152 outputs the packet with eNB-MME measurement designation information to the wire communication unit 104. The wire communication unit 104 sends the MME 3 the packet with eNB-MME measurement designation information via the second bearer 12.

Upon receipt of the packet with eNB-MME measurement designation information, the MME 3 sends the packet with eNB-MME measurement designation information back to the eNB 1.

The wire communication unit 104 receives the packet with eNB-MME measurement designation information via the second bearer 12, and then outputs the packet to the controller 102.

When the packet with eNB-MME measurement designation information is inputted, the packet-transmission processing unit 152 learns from the eNB-MME measurement designation information that the time length of packet transfer between the eNB 1 and the MME 3 needs to be measured. Further, the packet-transmission processing unit 152 outputs the packet with eNB-MME measurement designation information to the radio communication unit 106. The radio communication unit 106 sends the UE 2 the packet with eNB-MME measurement designation information via the antenna 108 and the first bearer 11.

(Second Processing)

Figure 12:
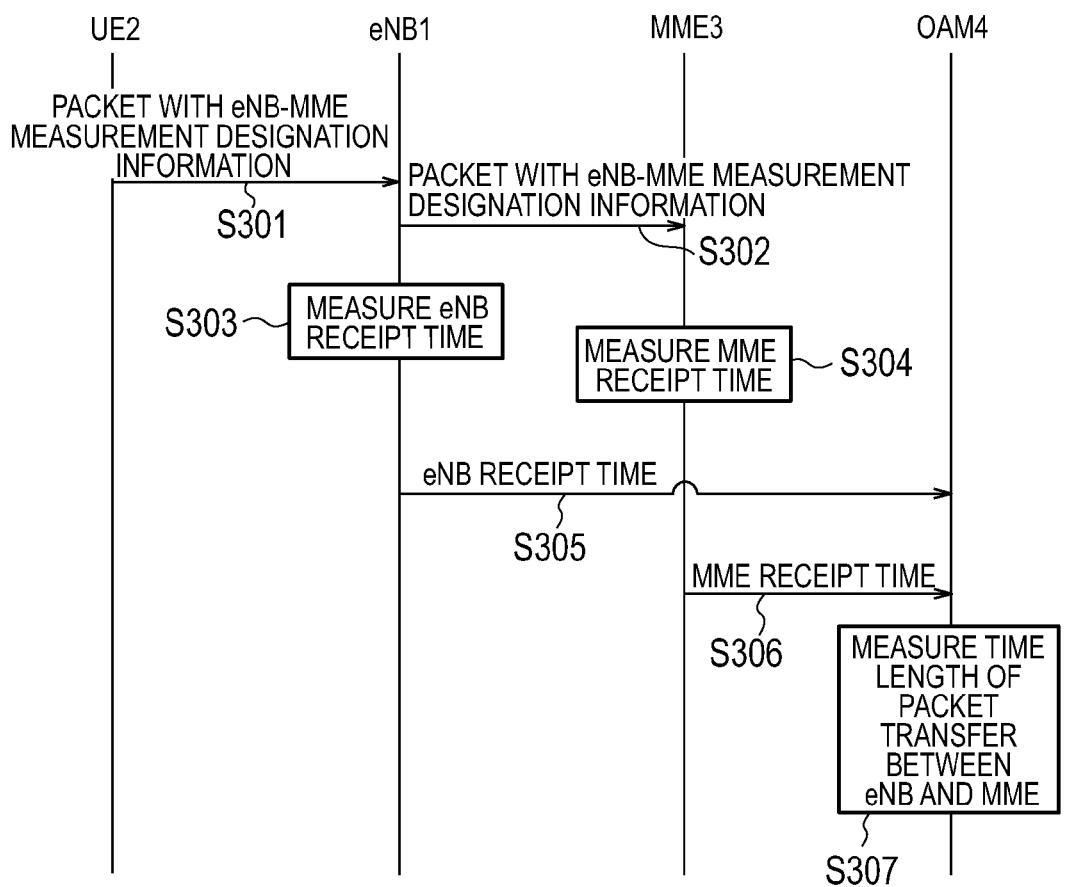
FIG. 12 is a sequence diagram showing a second operation of the radio communication system measuring the time length of packet transfer, according to the embodiment of the present invention.

(The Following Processes Correspond to Steps S301, S302, and S305 in FIG. 12.)

The UE 2 sends a packet with eNB-MME measurement designation information via the first bearer 11.

The radio communication unit 106 receives the packet with eNB-MME measurement designation information via the first bearer 11 and the antenna 108. Further, the radio communication unit 106 outputs the packet with eNB-MME measurement designation information to the controller 102.

When the packet with eNB-MME measurement designation information is inputted, the packet-transmission processing unit 152 learns from the eNB-MME measurement designation information that the time length of packet transfer between the eNB 1 and the MME 3 needs to be measured. Further, the packet-transmission processing unit 152 outputs the packet with eNB-MME measurement designation information to the wire communication unit 104. The wire communication unit 104 sends the MME 3 the packet with eNB-MME measurement designation information via the second bearer 12.

The transmission-time measurement unit 105 measures a time at which the radio communication unit 106 receives the packet with eNB-MME measurement designation information (an eNB receipt time). Further, the transmission-time measurement unit 153 outputs information on the eNB receipt time to the wire communication unit 104. The wire communication unit 104 sends the OAM 4 the eNB receipt time information.

(1.3) Configuration of the UE 2

Figure 7:
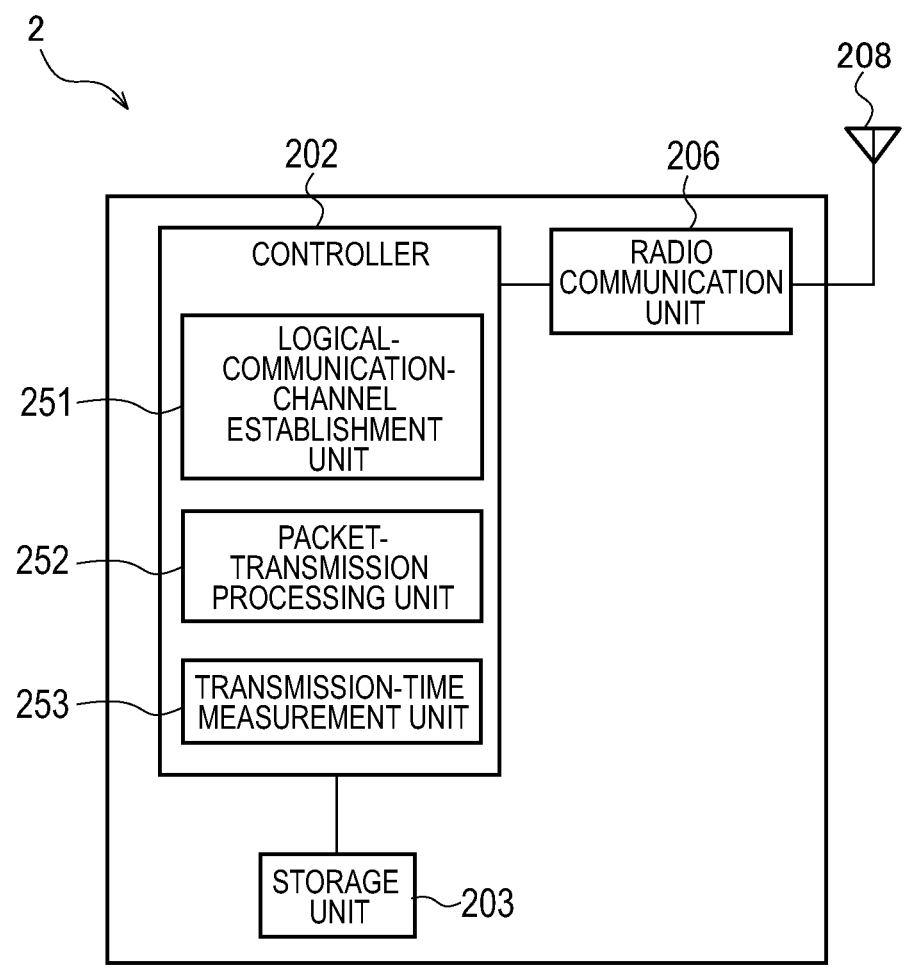
FIG. 7 is a diagram showing the configuration of a UE according to the embodiment of the present invention.

FIG. 7 is a diagram showing the configuration of the UE 2. The UE 2 shown in FIG. 7 includes a controller 202, a storage unit 203, a radio communication unit 206, and an antenna 208.

The controller 202 is configured by, for example, a CPU (Central Processing Unit) or a DSP (Digital Signal Processor), and controls the various functions of the UE 2. The storage unit 203 is configured by, for example, a memory, and stores various pieces of information used for control and the like in the UE 2.

The radio communication unit 206 includes an RF circuit, a baseband circuit, and the like to perform modulation and demodulation, coding and decoding, and the like, and performs transmission and reception of radio signals between the UE 2 and the eNB 1 via the antenna 208.

The controller 202 includes a logical-communication-channel establishment unit 251, a packet-transmission processing unit 252, and a transmission-time measurement unit 253.

The logical-communication-channel establishment unit 251 performs processing for establishment of the first bearer 11 between the eNB 1 and the UE 2.

Specifically, the first bearer 11 is established as follows. First, the logical-communication-channel establishment unit 251 generates a packet including an RRC Connection Setup message and accompanied by first-bearer establishment control information, and outputs the packet to the radio communication unit 206. Via the antenna 208, the radio communication unit 206 sends the packet including the RRC Connection Setup message and accompanied by the first-bearer establishment control information.

As described earlier, upon receipt of the packet including the RRC Connection Setup message and accompanied by the first-bearer establishment control information, the eNB 1 sends a packet including an RRC Connection Setup Complete message and accompanied by the first-bearer establishment control information.

Via the antenna 208, the radio communication unit 206 receives the packet including the RRC Connection Setup Complete message and accompanied by the first-bearer establishment control information, and outputs the packet to the controller 102.

As described above, the first bearer 11 is established through transmission and reception of the packet including the RRC Connection Setup message and accompanied by the first-bearer establishment control information and the packet including the RRC Connection Setup Complete message and accompanied by the first-bearer establishment control information, between the eNB1 and the UE 2.

After the establishment of the first bearer 11, any of the following third processing and fourth processing related to measurement of the time length of packet transfer is performed.

(Third Processing)

(The Following Processes Correspond to Steps S201, S202, S203, S204, S205, S207, S209, S211, S212, and S213 in FIG. 11.)

The packet-transmission processing unit 252 generates a packet accompanied by eNB-UE measurement designation information (a packet with eNB-UE measurement designation information), and outputs the packet to the radio communication unit 206. The radio communication unit 206 sends the eNB 1 the packet with eNB-UE measurement designation information via the antenna 208 and the first bearer 11.

The transmission-time measurement unit 253 measures a time at which the radio communication unit 206 sends the packet with eNB-UE measurement designation information (an eNB-UE transmission time).

Upon receipt of the packet with eNB-UE measurement designation information, the eNB 1 sends this packet with eNB-UE measurement designation information back to the UE 2.

The radio communication unit 206 receives the packet with eNB-UE measurement designation information from the eNB 1 via the first bearer 11 and the antenna 208, and outputs the packet to the controller 202.

The transmission-time measurement unit 253 measures a time at which the radio communication unit 206 receives the packet with eNB-UE measurement designation information (an eNB-UE receipt time). Further, the transmission-time measurement unit 253 outputs information on the eNB-UE transmission time and information on the eNB-UE receipt time to the radio communication unit 206.

The radio communication unit 206 sends the OAM 4 the information on the eNB-UE transmission time and the information on the eNB-UE receipt time via the antenna 208, the first bearer 11, and the eNB 1.

Moreover, the packet-transmission processing unit 252 generates a packet accompanied by eNB-MME measurement designation information (a packet with eNB-MME measurement designation information), and outputs the packet to the radio communication unit 206. The radio communication unit 206 sends the eNB 1 the packet with eNB-MME measurement designation information via the antenna 208 and the first bearer 11.

The transmission-time measurement unit 253 measures a time at which the radio communication unit 206 sends the packet with eNB-MME measurement designation information (eNB-MME transmission time).

Upon receipt of the packet with eNB-MME measurement designation information, the eNB 1 sends the MME 3 this packet with eNB-MME measurement designation information. Upon receipt of the packet with eNB-MME measurement designation information, the MME 3 sends the packet with eNB-MME measurement designation information back to the eNB 1. Upon receipt of the packet with eNB-MME measurement designation information, the eNB 1 sends the UE 2 this packet with eNB-MME measurement designation information.

The radio communication unit 206 receives the packet with eNB-MME measurement designation information via the first bearer 11 and the antenna 208, and outputs the packet to the controller 202.

The transmission-time measurement unit 253 measures a time at which the radio communication unit 206 receives the packet with eNB-MME measurement designation information (eNB-MME receipt time). Further, the transmission-time measurement unit 253 outputs information on the eNB-MME transmission time and information on the eNB-MME receipt time to the radio communication unit 206.

The radio communication unit 206 sends the OAM 4 the information on the eNB-MME transmission time and the information on the eNB-MME receipt time via the first bearer 11 and the eNB 1.

(Fourth Processing)

(The Following Process Corresponds to Step S301 in FIG. 12.)

The packet-transmission processing unit 252 generates a packet accompanied by eNB-MME measurement designation information (a packet with eNB-MME measurement designation information), and outputs the packet to the radio communication unit 206. The radio communication unit 206 sends the eNB 1 the packet with eNB-MME measurement designation information via the antenna 208 and the first bearer 11.

(1.4) Configuration of the MME 3

Figure 8:
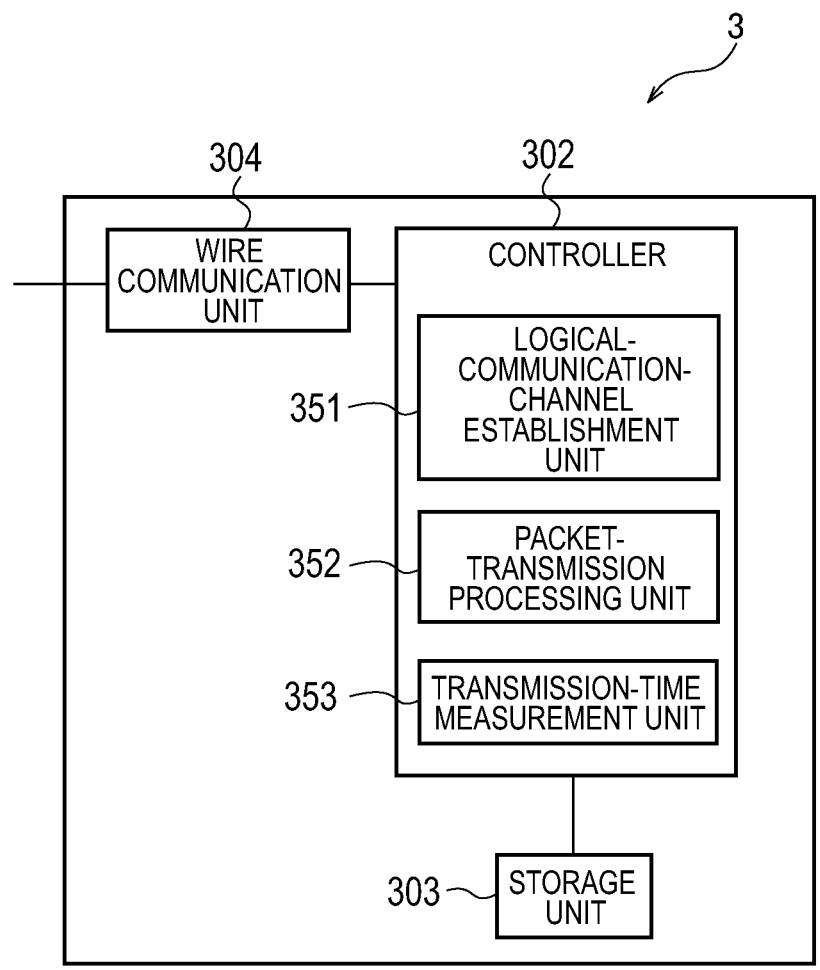
FIG. 8 is a diagram showing the configuration of an MME according to the embodiment of the present invention.

FIG. 8 is a diagram showing the configuration of the MME 3. The MME 3 shown in FIG. 8 includes a controller 302, a storage unit 303, and a wire communication unit 304.

The controller 302 is configured by, for example, a CPU (Central Processing Unit) or a DSP (Digital Signal Processor), and controls various functions of the MME 3. The storage unit 303 is configured by, for example, a memory, and stores various pieces of information used for control and the like in the MME 3.

The wire communication unit 304 performs data transmission and reception between the MME 3 and the eNB 1, and between the MME 3 and the OAM 4.

The controller 302 includes a logical-communication-channel establishment unit 351, a packet-transmission processing unit 352, and a transmission-time measurement unit 353.

The logical-communication-channel establishment unit 351 performs processing for establishment of the second bearer 12 between the eNB 1 and the MME 3.

Specifically, the second bearer 12 is established as follows. First, the wire communication unit 304 receives a packet from the eNB1, the packet including an S1-AP Initial UE message and accompanied by second-bearer establishment control information. The wire communication unit 304 then outputs the packet to the controller 302.

When the packet including the S1-AP Initial UE message and accompanied by the second-bearer establishment control information is inputted, the logical-communication-channel establishment unit 351 generates a packet including an S1-AP Initial Context Setup Request message and accompanied by the second-bearer establishment control information. Further, the logical-communication-channel establishment unit 351 outputs the packet to the wire communication unit 304, the packet including the S1-AP Initial Context Setup Request message and accompanied by the second-bearer establishment control information.

The wire communication unit 304 sends the eNB 1 the packet including the S1-AP Initial Context Setup Request message and accompanied by the second-bearer establishment control information.

Then, the wire communication unit 304 receives a packet from the eNB 1 and outputs the packet to the controller 302, the packet including an S1-AP Initial Context Setup Response message and accompanied by the second-bearer establishment control information.

As described above, the second bearer 12 is established through transmission and reception of the packet including the S1-AP Initial UE message and accompanied by the second-bearer establishment control information, the packet including the S1-AP Initial Context Setup Request message and accompanied by the second-bearer establishment control information, and the packet including the S1-AP Initial Context Setup Response message and accompanied by the second-bearer establishment control information, between the eNB1 and the MME 3.

After the second bearer 12 is established, any of the following fifth processing and sixth processing related to measurement of the time length of packet transfer is performed.

(Fifth Processing)
(The Following Processes Correspond to Steps S208 and S210 in FIG. 11.)

The wire communication unit 304 receives a packet with eNB-MME measurement designation information from the eNB 1 via the second bearer 12. Then, the wire communication unit 304 outputs the packet with eNB-MME measurement designation information to the controller 302.

When the packet with eNB-MME measurement designation information is inputted, the packet-transmission processing unit 352 learns from the eNB-MME measurement designation information that the time length of packet transfer between the eNB 1 and the MME 3 needs to be measured. Then, the packet-transmission processing unit 352 outputs the packet with eNB-MME measurement designation information to the wire communication unit 304. The wire communication unit 304 sends the eNB 1 the packet with eNB-MME measurement designation information via the second bearer 12.

(Sixth Processing)
(The Following Processes Correspond to Steps S302, S304, and S306 in FIG. 12.)

The wire communication unit 304 receives a packet with eNB-MME measurement designation information from the eNB 1 via the second bearer 12, and outputs the packet to the controller 302.

The transmission-time measurement unit 353 measures a time at which the wire communication unit 304 receives the packet with eNB-MME measurement designation information (an MME receipt time). Further, the transmission-time measurement unit 353 outputs information on the MME receipt time to the wire communication unit 304. The wire communication unit 304 sends the OAM 4 the information on the MME receipt time.

(1.5) Configuration of the OAM 4

Figure 9:
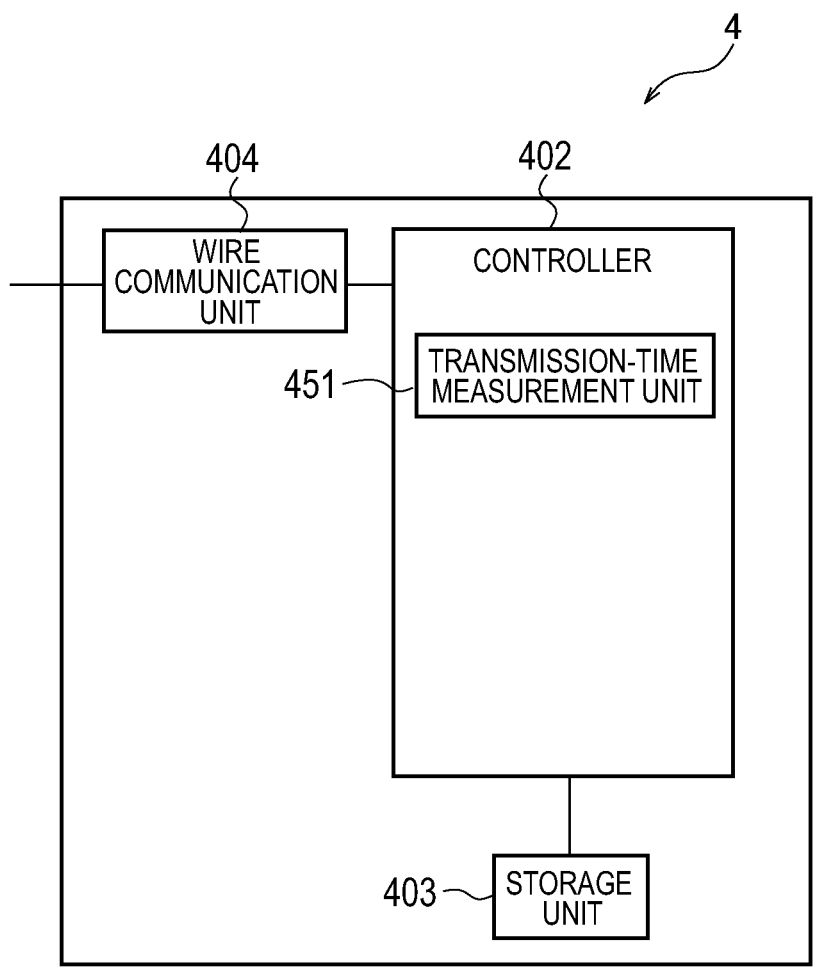
FIG. 9 is a diagram showing the configuration of an OAM according to the embodiment of the present invention.

FIG. 9 is a diagram showing the configuration of the OAM 4. The OAM 4 shown in FIG. 9 includes a controller 402, a storage unit 403, and a wire communication unit 404.

The controller 402 is configured by, for example, a CPU (Central Processing Unit) or a DSP (Digital Signal Processor), and controls various functions of the OAM 4. The storage unit 403 is configured by, for example, a memory, and stores various pieces of information used for control and the like in the OAM 4.

The wire communication unit 404 performs data transmission and reception between the OAM 4 and the eNB 1 and between the OAM 4 and the MME 3.

The controller 402 includes a transfer-time measurement unit 451. The transfer-time measurement unit 451 performs any of the following seventh processing and eighth processing related to measurement of the time length of packet transfer.

(Seventh Processing)
(The Following Processes Correspond to Steps S205, S206, S213, and S214 in FIG. 11.)

The wire communication unit 404 receives information on the eNB-UE transmission time and information on the eNB-UE receipt time from the UE 2. Further, the wire communication unit 404 outputs the eNB-UE transmission time information and the eNB-UE receipt time information to the controller 402.

When the eNB-UE transmission time information and the eNB-UE receipt time information are inputted, the transfer-time measurement unit 451 subtracts a time indicated by the eNB-UE transmission time information from a time indicated by the eNB-UE receipt time information, and thereby measures the time length of packet transfer between the eNB 1 and the UE 2.

Further, the wire communication unit 404 receives information on the eNB-MME transmission time and information on the eNB-MME receipt time from the UE 2. Then, the wire communication unit 404 outputs the eNB-MME transmission time information and the eNB-MME receipt time information to the controller 402.

When the eNB-MME transmission time information and the eNB-MME receipt time information are inputted, the transfer-time measurement unit 451 subtracts a time indicated by the eNB-MME transmission time information from a time indicated by the eNB-MME receipt time information, and thereby measures the time length of packet transfer between the UE 2 and the MME 3. Further, the transfer-time measurement unit 451 subtracts the time length of packet transfer between the eNB 1 and the UE 2 from the time length of packet transfer between the UE 2 and the MME 3, and thereby measures the time length of packet transfer between the eNB 1 and the MME 3.

(Eighth Processing)
(The Following Processes Correspond to Steps S305, S306, and S307 in FIG. 12.)

The wire communication unit 404 receives information on the eNB receipt time from the eNB 1 and information on the MME receipt time from the MME 3. Then, the wire communication unit 404 outputs the eNB receipt time information and the MME receipt time information to the controller 402.

When the eNB receipt time information and the MME receipt time information are inputted, the transfer-time measurement unit 451 subtracts a time indicated by the eNB receipt time information from a time indicated by the MME receipt time information, and thereby measures the time length of packet transfer between the eNB 1 and the MME 3.

(2) Operation of the Radio Communication System

Next, the operation of the eNB 1 is described. FIG. 10 is a sequence diagram showing the operation of the radio communication system 100 establishing the first bearer 11 and the second bearer 12.

In Step S101, the UE 2 sends a packet including an RRC Connection Setup message and accompanied by first-bearer establishment control information, and the eNB 1 receives the packet including the RRC Connection Setup message and accompanied by the first-bearer establishment control information.

In Step S102, the eNB 1 sends a packet including an RRC Connection Setup Complete message and accompanied by the first-bearer establishment control information, and the UE 2 receives the packet including the RRC Connection Setup Complete message and accompanied by the first-bearer establishment control information.

Through the transmission and reception in Steps S101 and S102, the first bearer 11 is established between the eNB 1 and the UE 2 in Step S103.

In Step S104, the eNB 1 sends a packet including an S1-AP Initial UE message and accompanied by second-bearer establishment control information, and the MME 3 receives the packet including the S1-AP Initial UE message and accompanied by the second-bearer establishment control information.

In Step S105, the MME 3 sends a packet including an S1-AP Initial Context Setup Request message and accompanied by the second-bearer establishment control information, and the UE 2 receives the packet including the S1-AP Initial Context Setup Request message and accompanied by the second-bearer establishment control information.

In Step S106, the eNB 1 sends a packet including an S1-AP Initial Context Setup Response message and accompanied by the second-bearer establishment control information, and the MME 3 receives the packet including the S1-AP Initial Context Setup Response message and accompanied by the second-bearer establishment control information.

Through the transmission and reception in Steps S104 to S106, the second bearer 12 is established between the eNB 1 and the MME 3 in Step S107.

FIG. 11 is a sequence diagram showing a first operation of the radio communication system 100 measuring the time length of packet transfer. The operation shown in FIG. 11 corresponds to the first processing by the eNB 1, the third processing by the UE 2, the fifth processing by the MME 3, and the seventh processing by the OAM 4, described above.

In Step S201, the UE 2 sends a packet with eNB-UE measurement designation information via the first bearer 11, and the eNB 1 receives the packet with eNB-UE measurement designation information via the first bearer 11. In Step S202, the UE 2 measures an eNB-UE transmission time.

In Step S203, the eNB 1 sends the packet with eNB-UE measurement designation information via the first bearer 11, and the UE 2 receives the packet with eNB-UE measurement designation information via the first bearer 11. In Step S204, the UE 2 measures an eNB-UE receipt time.

In Step S205, the UE 2 sends the OAM 4 information on the eNB-UE transmission time and information on the eNB-UE receipt time, and the OAM 4 receives the information on the eNB-UE transmission time and the information on the eNB-UE receipt time.

In Step S206, the OAM 4 subtracts a time indicated by the eNB-UE transmission time information from a time indicated by the eNB-UE receipt time information, and thereby measures the time length of packet transfer between the eNB 1 and the UE 2.

In Step S207, the UE 2 sends a packet with eNB-MME measurement designation information via the first bearer 11, and the eNB 1 receives the packet with eNB-MME measurement designation information via the first bearer 11. In Step S208, the eNB 1 sends the packet with eNB-MME measurement designation information via the second bearer 12, and the MME 3 receives the packet with eNB-MME measurement designation information via the second bearer 12.

In Step S209, the UE 2 measures an eNB-MME transmission time.

In Step S210, the MME 3 sends the packet with eNB-MME measurement designation information via the second bearer 12, and the eNB 1 receives the packet with eNB-MME measurement designation information via the second bearer 12. In Step S211, the eNB 1 sends the packet with eNB-MME measurement designation information via the first bearer 11, and the UE 2 receives the packet with eNB-MME measurement designation information via the first bearer In Step S212, the UE 2 measures an eNB-MME transmission time.

In Step S213, the UE 2 sends the OAM 4 information on the eNB-MME receipt time and the eNB-MME transmission time, and the OAM 4 receives the information on the eNB-MME receipt time and the eNB-MME transmission time.

In Step S214, the OAM 4 subtracts a time indicated by the eNB-MME transmission time information from a time indicated by the eNB-MME receipt time information, and thus measures the time length of packet transfer between the UE 2 and the MME 3. Then, the OAM 4 subtracts the time length of packet transfer between the UE 2 and the MME 3 from the time length of packet transfer between the eNB 1 and the UE 2, and thereby measures the time length (TTL) of packet transfer between the eNB 1 and the MME 3.

FIG. 12 is a sequence diagram showing a second operation of the radio communication system 100 measuring the length of packet-transfer time. The operation shown in FIG. 12 corresponds to the second processing by the eNB 1, the fourth processing by the UE 2, the sixth processing by the MME 3, and the eighth processing by the OAM 4, described above.

In Step S301, the UE 2 sends a packet with eNB-MME measurement designation information via the first bearer 11, and the eNB 1 receives the packet with eNB-MME measurement designation information via the first bearer 11. In Step S302, the eNB 1 sends the packet with eNB-MME measurement designation information via the second bearer 12, and the eNB 1 receives the packet with eNB-MME measurement designation information via the second bearer 12.

In Step S303, the eNB 1 measures an eNB receipt time. In Step S304, the MME 3 measures an MME receipt time.

In Step S305, the eNB 1 sends information on the eNB receipt time, and the OAM 4 receives the information on the eNB receipt time. In Step S306, the MME 3 sends information on the MME receipt time, and the OAM 4 receives the information on the MME receipt time.

In Step S307, the OAM 4 subtracts a time indicated by the eNB receipt time information from a time indicated by the MME receipt time information, and thereby measures the time length of packet transfer between the eNB 1 and the MME 3.

(3) Advantageous Effects

In the radio communication system 100 according to the embodiment of the present invention, the eNB 1 and the UE 2 establish the first bearer 11 between the eNB 1 and the UE 2 at the RRC layer, and the eNB 1 and the MME 3 establish the second bearer 12 between the eNB 1 and the MME 3 at the S1-AP layer. The OAM 4 measures the time length (TTL) of packet transfer between the eNB 1 and the UE 2, based on the transmission state of packets transmitted on the first bearer 11, and also measures the time length of packet transfer between the eNB 1 and the MME 3, based on the transmission state of packets transmitted on the second bearer 12.

In this way, the first bearer 11 is established to measure the time length of packet transfer between the eNB 1 and the UE 2, and the second bearer 12 is established to measure the time length of packet transfer between the eNB 1 and the MME 3. Then, transmission of packets via the first bearer 11 and the second bearer 12 allows the OAM 4 to measure the time length of packet transfer between the eNB 1 and the UE 2 and the time length of packet transfer between the eNB 1 and the MME 3.

If ICMP packets at the Layer 3 are used for the measurement, the ICMP packets not only pass through a channel in a radio zone, but also a channel on the core network. Accordingly, the time length of packet transfer between the eNB 1 and the UE 2 cannot be measured. Further, if packets transmitted between the UE 2 and the MME 3 at the NAS layer are used for the measurement, the eNB 1 in the middle is not involved in the processing at the NAS layer because the NAS layer is for tunneling. Accordingly, the time length of packet transfer between the eNB 1 and the UE 2 and the time length of packet transfer between the eNB 1 and the UE 2 cannot be measured.

In contrast, in this embodiment, the first bearer 11 is established at the RRC layer which is at a level lower than the NAS layer and higher than the Layer 3, and the second bearer 12 is established at the S1-AP layer which is at the same level as the RRS layer. Accordingly, the eNB 1 and the UE 2 can be involved in the processing at the RRS layer, and the eNB 1 and the MME 3 can be involved in the processing at the S1-AP layer. Thus, transmission of packets via the first bearer 11 and the second bearer 12 allows the eNB 1, the UE 2, and the MME 3 to perform processing on those packets, and thus enables measurement of the time length of packet transfer between the eNB 1 and the UE 2 and the time length of packet transfer between the eNB 1 and the MME 3.

(4) Other Embodiments

As described above, the present invention has been described by using the embodiment of the present invention. However, it should not be understood that the description and drawings which constitute part of this disclosure limit the present invention. From this disclosure, various alternative embodiments, examples, and operation techniques will be easily found by those skilled in the art.

In the embodiment described above, the eNB 1, the UE 2, and the MME 3 measure a time of packet transmission and a time of packet receipt and send them to the OAM 4. Instead, the eNB 1, the UE 2, and the MME 3 may send the OAM 4 other information usable for measurement of the time length of packet transfer.

In the embodiment described above, the OAM 4 measures the time length of packet transfer. Instead, any of the eNB 1, the UE 2, and the MME 3 may include functionality of the transfer-time measurement unit 451 to measure the time length of packet transfer by using that functionality.

In the embodiment described above, the communication performance between the eNB 1 and the UE 2 is the time length of packet transfer between the eNB 1 and the UE 2, and the communication performance between the eNB 1 and the MME 3 is the time length of packet transfer between the eNB 1 and the MME 3. The present invention can be similarly applied to a case where the communication performance is jitter, packet loss rate, or the like.

In such a case, when a packet is transmitted via the first bearer 11, any of the eNB 1 and the UE 2 measures the jitter, packet loss rate, or the like and sends the OAM 4 information on a result of the measurement. Meanwhile, when a packet is transmitted via the second bearer 12, any of the eNB 1 and the MME 3 measures the jitter, packet loss rate, or the like, and sends the OAM 4 information on a result of the measurement. The OAM 4 receives the information on the measurement results.

Although the LTE system is used in the embodiment described above, the present invention may be applied to other type of radio communication system such as a radio communication system based on WiMAX (IEEE 802.16).

As described above, it should be understood that the present invention includes various embodiments which are not described herein.

This application claims the benefit of priority from Japanese Patent Application No. 2010-175805 (filed on Aug. 4, 2010), the entire contents of which are incorporated herein by reference.

INDUSTRIAL APPLICABILITY

As described, the radio communication system, the radio base station, the radio terminal, the network-side apparatus, and the communication performance monitoring method according to the present invention can measure inter-node communication performance, and are therefore useful in radio communication such as mobile communication.

The invention claimed is:

1. A radio communication system, comprising:
a network-side apparatus;
a radio base station controlled by the network-side apparatus;
a radio terminal connected to the radio base station; and
a monitor apparatus that monitors a network, wherein the monitor apparatus is a standalone monitor apparatus that is separated from the radio terminal, the radio base station, and the network-side apparatus, wherein
the radio terminal, without receiving instructions for a measurement of communication performance, transmits a packet for the measurement of communication performance between the radio base station and the network-side apparatus to the radio base station via a first barrier, wherein the first barrier is a logical communication channel between the radio base station and the radio terminal at Radio Resource Control (RRC) layer,
the radio base station transmits the packet received from the radio terminal to the network-side apparatus via a second barrier, wherein the second barrier is a logical communication channel between the radio base station and the network-side apparatus at S1 Application Part (S1-AP) layer,
the radio base station transmits a first receipt time when the radio base station receives the packet from the radio terminal, to the monitor apparatus, and
the network-side apparatus transmits a second receipt time when the network-side apparatus receives the packet from the radio base station, to the monitor apparatus.

2. The radio communication system according to claim 1, wherein the monitor apparatus measures the communication performance between the radio base station and the network-side apparatus on the basis of the first receipt time and the second receipt time.

3. The radio communication system according to claim 1, wherein the monitor apparatus measures a time length of packet transfer between the radio base station and the network-side apparatus by subtracting the first receipt time from the second receipt time.

4. A radio base station which is controlled by a network-side apparatus and to which a radio terminal is connected, the radio base station comprising:
 a receiver that receives, from the radio terminal, via a first bearer that is a logical communication channel between the radio base station and the radio terminal at Radio Resource Control (RRC) layer, a packet for measurement of communication performance between the radio base station and the network-side apparatus without transmitting instructions for the measurement of communication performance to the radio terminal; and
 a transmitter that transmits the packet received from the radio terminal to the network-side apparatus via a second barrier that is a logical communication channel between the radio base station and the network-side apparatus at S1 Application Part (S1-AP) layer, wherein
 the transmitter transmits a first receipt time when the radio base station receives the packet from the radio terminal, to a monitor apparatus that monitors a network, wherein the monitor apparatus is a standalone monitor apparatus that is separated from the radio terminal, the radio base station, and the network-side apparatus; and receives a second receipt time when the network-side apparatus receives the packet from the radio base station, from the network-side apparatus.

5. A monitor apparatus that monitors a network, comprising:
 a controller; and
 a receiver, wherein
 the receiver receives, from a radio base station controlled by a network-side apparatus, a first receipt time when the radio base station receives, without transmitting instructions for a measurement of communication performance, a packet from a radio terminal connected to the radio base station via a first bearer that is a logical communication channel between the radio base station and the radio terminal at the Radio Resource Control (RRC) layer, for the measurement of communication performance between the radio base station and a network-side apparatus,
 the receiver receives, from the network-side apparatus, a second receipt time when the network-side apparatus receives via a second barrier that is a logical communication channel between the radio base station and the network-side apparatus at the S1 Application Part (S1-AP) layer, the packet from the radio base station, and wherein
 the monitor apparatus is a standalone monitor apparatus that is separated from the radio terminal, the radio base station, and the network-side apparatus.

6. The monitor apparatus according to claim 5, wherein the controller measures the communication performance between the radio base station and the network-side apparatus on the basis of the first receipt time and the second receipt time.

7. The monitor apparatus according to claim 5, wherein the controller measures a time length of packet transfer between the radio base station and the network-side apparatus by subtracting the first receipt time from the second receipt time.

* * * * *